US009429760B2

(12) United States Patent
Nicholson (10) Patent No.: US 9,429,760 B2
(45) Date of Patent: Aug. 30, 2016

(54) SPATIAL COLOR MIXING IN A CASCADE IMAGING SYSTEM

(71) Applicant: CHRISTIE DIGITAL SYSTEMS USA, INC., Cypress, CA (US)

(72) Inventor: Stuart Nicholson, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 71 days.

(21) Appl. No.: 14/508,460

(22) Filed: Oct. 7, 2014

(65) Prior Publication Data

US 2016/0097932 A1   Apr. 7, 2016

(51) Int. Cl.
*G02B 27/09* (2006.01)
*G06T 1/20* (2006.01)
*G09G 3/20* (2006.01)
*G09G 3/34* (2006.01)

(52) U.S. Cl.
CPC ............ *G02B 27/09* (2013.01); *G06T 1/20* (2013.01); *G09G 3/2022* (2013.01); *G09G 3/3413* (2013.01); *G09G 2310/0235* (2013.01); *G09G 2320/0646* (2013.01); *G09G 2320/0666* (2013.01)

(58) Field of Classification Search
CPC   G02B 26/001; G02B 26/0833; G02B 26/06; H04B 10/541
USPC .......................................... 359/238, 15, 599
See application file for complete search history.

(56) References Cited

U.S. PATENT DOCUMENTS

| 5,233,338 | A * | 8/1993 | Surguy ................. G09G 3/3406 345/88 |
| 6,758,565 | B1 * | 7/2004 | Cobb ..................... G02B 13/22 348/E5.139 |
| 2005/0162615 | A1 | 7/2005 | Penn |
| 2006/0082692 | A1 | 4/2006 | Kamijima et al. |
| 2007/0120786 | A1 * | 5/2007 | Bellls .................... G09G 3/3413 345/84 |
| 2009/0128883 | A1 | 5/2009 | Endo et al. |
| 2009/0225234 | A1 | 9/2009 | Ward et al. |
| 2010/0296065 | A1 * | 11/2010 | Silverstein ............. G02B 27/48 353/38 |
| 2012/0038693 | A1 | 2/2012 | Kang et al. |

OTHER PUBLICATIONS

Meng Pu-hui et al. in their publication "Speckle noise reduction in digital holography due to angular diversity by Spatial Light Modulator", proc. of SPIE vol. 8556, 855619-1 @2012 SPIE. CCC code:0277-786/12/$18.doi:10.1117/12.999397.*
Official Communication including European Search Report dated Jan. 25, 2016 for European Patent Application No. 15188337.8.

* cited by examiner

*Primary Examiner* — Stephone B Allen
*Assistant Examiner* — Rahman Abdur
(74) *Attorney, Agent, or Firm* — Perry + Currier, Inc.

(57) ABSTRACT

Spatial color mixing in a cascade imaging system is provided herein. The system comprises: at least two spatial light pre-modulators; and, a primary spatial light modulator, each of the at least two spatial light pre-modulators configured to vary illuminating light colors spatially across the primary spatial prime modulator simultaneously with at least two of the illuminating light colors, and the primary spatial light modulator configured to form the illuminating light colors into images and turn on pixels of each of the at least two of the illuminating light colors simultaneously in synchronization with the at least two spatial light pre-modulators.

12 Claims, 6 Drawing Sheets

| B-2.0-5.0 | RB-2.0-3.3 | W-2.0 |
|---|---|---|
| G-2.0 | GB-2.0 | W-2.0 |
| R-2.0-3.3 | RG-2.0 | W-2.0 |

Viewer Image 501

SPATIAL COLOR MIXING IN A CASCADE IMAGING SYSTEM

FIELD

The specification relates generally to projection systems, and specifically to spatial color mixing in a cascade imaging system.

BACKGROUND

Multi-pre-modulator projection designs with a single-chip prime modulator can achieve high contrast performance from a broadband illuminator in a compact package but are not as efficient as multi-chip prime modulator designs due to the reduced duty cycle of high brightness light. For example, in some algorithms, image content to be displayed can be analyzed to optimize illumination sequence duty cycle to maximize the brightness of displayed content. However, such algorithms are limited to processing an entire image as the analysis affects the illumination modulation duty cycle, thus affecting the entire image. As a result, they have limited usefulness as any image with multiple saturated primary colors limited the duty cycle adjustment possible, especially when the image contained saturated primary colors of maximum brightness. Furthermore, while duty cycle adjustment can be used to optimize brightness of a single saturated color (e.g. red) but if two or more saturated colors appear (e.g. red and green) then duty cycle adjustment to optimize brightness is constrained.

SUMMARY

In general, this disclosure is directed to a cascade imaging system in which two or more pre-modulators simultaneously vary illuminating light colours spatially across the primary spatial prime modulator, and the primary spatial light modulator combines the illuminating light colours into images and turn on pixels of each of the at least two of the illuminating light colours simultaneously in synchronization with the at least two spatial light pre-modulators. An image processor that comprises an integrated sub-frame generator controls and synchronizes the pre-modulators and the prime modulator.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system comprising: at least two spatial light pre-modulators; and, a primary spatial light modulator, each of the at least two spatial light pre-modulators configured to vary illuminating light colours spatially across the primary spatial prime modulator simultaneously with at least two of the illuminating light colours, and the primary spatial light modulator configured to form the illuminating light colours into images and turn on pixels of each of the at least two of the illuminating light colours simultaneously in synchronization with the at least two spatial light pre-modulators.

The system can further comprise relay optics configured to direct the illuminating light colours from the at least two pre-modulators to the primary light modulator.

The pixels of each of the at least two of the illuminating light colours can represent saturated colour pixels.

Each of the at least two spatial light pre-modulators can be further configured to time-sequence the illuminating light colours across the primary spatial modulator.

Each of the at least two spatial light pre-modulators can be further configured to vary the illuminating light colours spatially across the primary spatial prime modulator at a resolution that is lower than the images formed by the primary light modulator.

The at least two spatial light pre-modulators can be further configured to not use one or more of the illuminating light colours and expand a respective duty cycle of remaining illuminating light colours.

One or more of the illuminating light colours can be operated at a maximum intensity, and the at least two spatial light pre-modulators can be further configured to reduce associated duty cycles of the one or more of the illuminating light colours while expanding respective duty cycles of remaining illuminating light colours.

Two or more of the illuminating light colours can be operated at a minimum intensity, and the at least two spatial light pre-modulators can be further configured to mix the two or more of the illuminating light colours onto the prime modulator during respective duty cycles of remaining illuminating light colours.

The system can further comprise one or more light sources configured to produce the illuminating light colours.

The at least two spatial light pre-modulators can comprise: a first light modulator configured to modulate a first illuminating colour; and a second light modulator configured to modulate a second illuminating colour and a third illuminating colour in a sequence.

The at least two spatial light pre-modulators can comprise: a first light modulator configured to modulate a first illuminating colour; a second light modulator configured to modulate a second illuminating colour; and a third light modulator configured to modulate a third illuminating colour.

The system can further comprise an image processor in communication with each of the at least two spatial light pre-modulators and the primary spatial light modulator, and the image processor can be configured to synchronize the at least two spatial light pre-modulators with the primary spatial light modulator. The system can further comprise a sub-frame generator integrated with the image processor.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
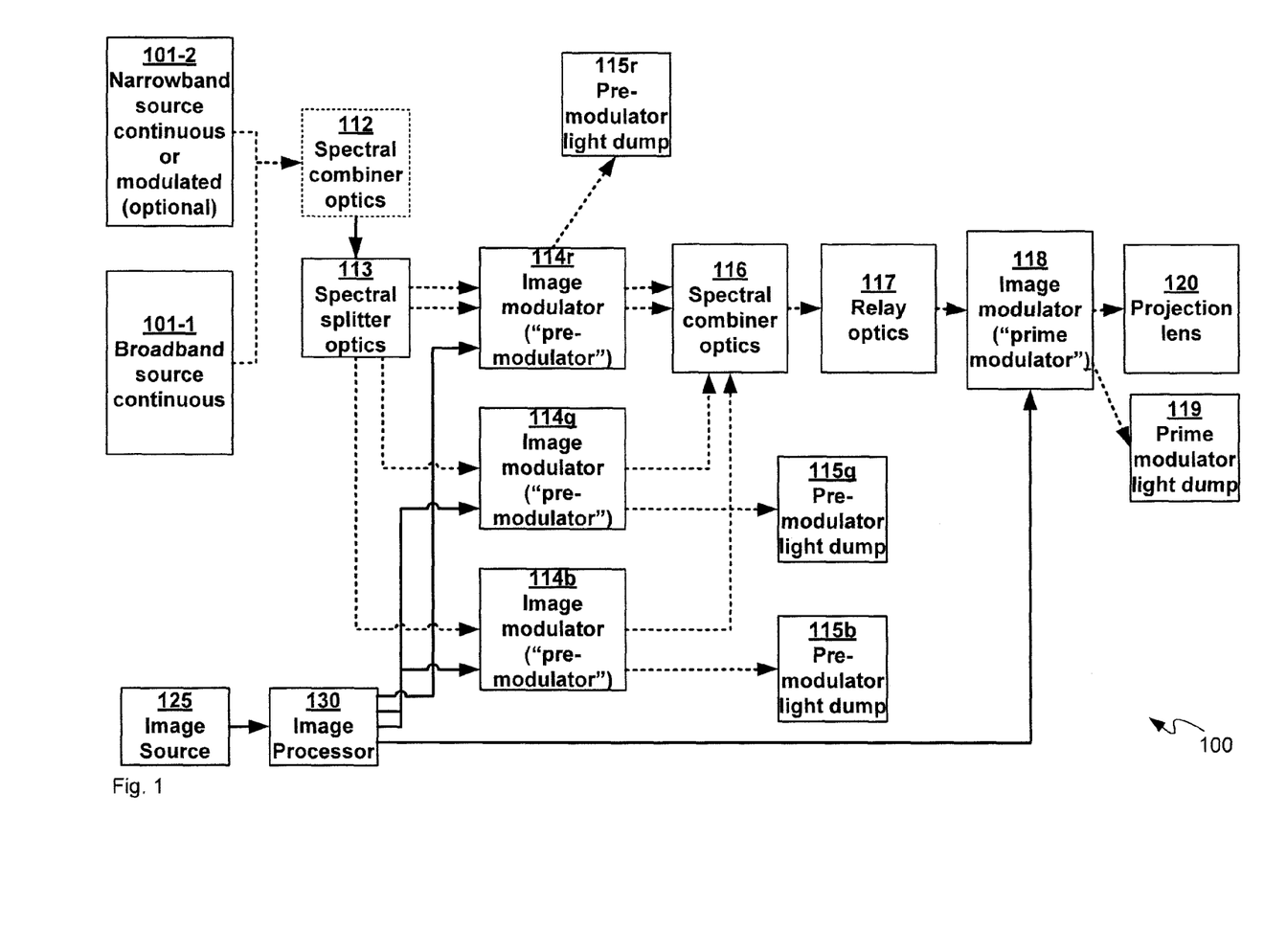
FIG. 1 depicts a cascade imaging, according to non-limiting implementations.

FIG. 1 depicts a cascade imaging system 100 with spatial colour mixing. System 100 comprises: one or more light sources 101-1, 101-2 (interchangeably referred to hereafter, collectively, as light sources 101, and generically as a light source 101); optional spectral combiner optics 112 (interchangeably referred to hereafter as optics 112); spectral splitter optics 113 (interchangeably referred to hereafter as optics 113); at least two spatial light pre-modulators 114r, 114g, 114b (interchangeably referred to hereafter, collectively, as pre-modulators 114, and generically as a pre-modulator 114); at least respective pre-modulator light dumps 115r, 115g, 115r (interchangeably referred to hereafter, collectively, as light dumps 115, and generically as a light dump 115); spectral combiner optics 116 (interchangeably referred to hereafter as optics 116); relay optics 117 (interchangeably referred to hereafter as optics 117); a primary spatial light modulator 118 (interchangeably referred to hereafter as a primary modulator 118); a prime modulator light dump 119 (interchangeably referred to hereafter as light dump 119); a projection lens 120; an image source 125; and an image processor 130.

In FIG. 1, electrical and/or data communication paths between components are depicted as solid lines, while light paths between components are depicted as stippled lines.

Light paths through system 100 are now described: light from one or more light sources 101 are conveyed to pre-modulators 114 via spectral splitter optics 113 and optionally spectral combiner optics 112. Optional spectral combiner optics 112 are configured to combine light from the one or more light sources 101, and spectral splitter optics 113 are configured to illuminate each pre-modulator 114 with respective illuminating light colours, including, but not limited to red, green and blue (e.g. optics 113 are configured to split light from light sources 101 into respective illuminating light colours for each pre-modulator 114). As such, optics 112, 113 comprise any suitable combination of optical elements configured to optionally combine and split light from light sources 101 into the illuminating colours, including, but not limited to, mirrors, dichroic mirrors, prisms, and the like. Further each of light sources 101 can comprise one or more broadband sources, and one or more narrowband sources; at a minimum light sources 101 are configured to emit light comprising the illuminating colours and can include, but are not limited to any suitable combination of laser light sources, light emitting materials, broadband sources (including, but not limited to, lamps etc.) and the like.

Each pre-modulator 114 comprises one or more of a phase modulator, a light modulator, a reflective light modulator, a transmissive light modulator, a liquid crystal on silicon (LCOS) device, a liquid crystal display (LCD) device, and a digital micromirror device (DMD), and the like. Similarly, primary modulator 118 comprises one or more of a phase modulator, a light modulator, a reflective light modulator, a transmissive light modulator, a liquid crystal on silicon (LCOS) device, a liquid crystal display (LCD) device, and a digital micromirror device (DMD), and the like.

In particular, each pre-modulator 114 is dedicated to modulating one or more illuminating colours. For example, as system 100 comprises three pre-modulators, and system 100 can be based on a red-green-blue (RGB) colour system, pre-modulator 114r can be dedicated to modulating a red illuminating colour, pre-modulator 114g can be dedicated to modulating a green illuminating colour, and pre-modulator 114b can be dedicated to modulating a blue illuminating colour. Hence, optics 113 can be configured to: illuminate pre-modulator 114r with red light, illuminate pre-modulator 114g with green light, and illuminate pre-modulator 114b with blue light. In some implementations, one or more of pre-modulators 114 can also be illuminated with one or more of a second colour and infrared light; for example, as depicted, pre-modulator 114r is illuminated with two colours, red and infrared light, and hence two stippled arrows are depicted extending from optics 113 to pre-modulator 114r.

Each pre-modulator 114 is configured to vary illuminating light colours spatially across primary spatial prime modulator 118 simultaneously with at least two of the illuminating light colours as described in more detail below. In other words, on-state light from each pre-modulator 114 is directed towards prime modulator 118, for example using spectral combiner optics 116 and relay optics 117. Off-state light is directed to respective light dumps 115, where the off-state light is one or more of absorbed, discarded and optionally, recycled.

Optics 116, 117 comprise any suitable combination of optical elements configured to convey the illuminating light colours from at least two pre-modulators 114 to primary light modulator 118 so that pixels of light from pre-modulators 114 illuminate corresponding pixels and/or areas of primary modulator 118 including, but not limited to, mirrors, dichroic mirrors, prisms, and the like.

In some implementations, pixels of pre-modulators 114 and pixels of primary modulator 118 can be in a one-to-one relationship, while in other implementations, a resolution of pre-modulators 114 can be less than a resolution of primary modulator 118. For example, while, in some implementations, direct pixel-to-pixel mapping can occur, between pre-modulators 114 and primary modulator 118, in other implementations, pre-modulator pixels are controlled to create blurry spots over several primary modulator pixels. Hence, adjacent pre-modulator pixels can result in overlapping blurry spots at primary modulator 118. Either way, optics 116, 117 convey light from areas of images formed using pre-modulators 114 that correspond to corresponding areas of images formed by prime modulator 118.

Specifically, primary spatial light modulator 118 is configured to combine the illuminating light colours into images, received from the at least two spatial light pre-modulators 114, and turn on pixels of each of the at least two of the illuminating light colours simultaneously in synchronization with the at least two spatial light pre-modulators 114 as described in further detail below. For example, red, green and blue images received at primary modulator 118 from pre-modulators 114 are combined at primary modulator 118 and on-pixel light from primary modulator 118, that form the images, is directed to projection lens 120, which in turn directs the images towards one or more of a screen, a viewer and the like. Off-state light is directed towards light dump 119, which can be similar to light dumps 115.

System 100 can hence be referred to as cascade imaging system and the techniques referred to herein as cascade spatial colour mixing.

Image source 125 can include, but is not limited to, a memory storing digital copies of images for projection by system 100. Image processor 130 is in communication with image source 125, and each of at least two spatial light pre-modulators 114 and primary spatial light modulator 118. Image processor 130 is configured to: receive the digital copies of the images from image source 125; and control each of the least two spatial light pre-modulators 114 and primary spatial light modulator 118 in accordance with digital copies of the images, including, but not limited to, synchronizing the at least two spatial light pre-modulators 114 with primary spatial light modulator 118. Hence, image processor 130 controls each of the least two spatial light pre-modulators 114 and primary spatial light modulator 118 to form the images as described in further detail below.

In some implementations, system 100 can be operated in a time-sequence mode, as in the prior art, while in other implementations system 100 can be operated modulation-sequenced mode (which can also be referred to as an illuminator-sequenced mode), according to present implementations. In a time-sequenced mode, pre-modulators 114 illuminate primary modulator 118 in a sequence, similar to a system in which one pre-modulator is time-sequentially illuminated with red, green and blue light and the one pre-modulator sequentially forms red, green and blue images, which illuminate a primary modulator in a sequence; when a particular illuminating colour is illuminating the primary modulator, other illuminating colours are not illuminating the primary modulator. The red, green and blue images are conveyed to a viewer in sequence, and the viewer visually combines the images into a full-colour image. In other words, such systems rely on the temporal low-pass filter characteristic of human vision where rapidly changing intensity levels are perceived as the average intensity over time, and rapidly changing colour are perceived as an average colour over time.

Figure 2:
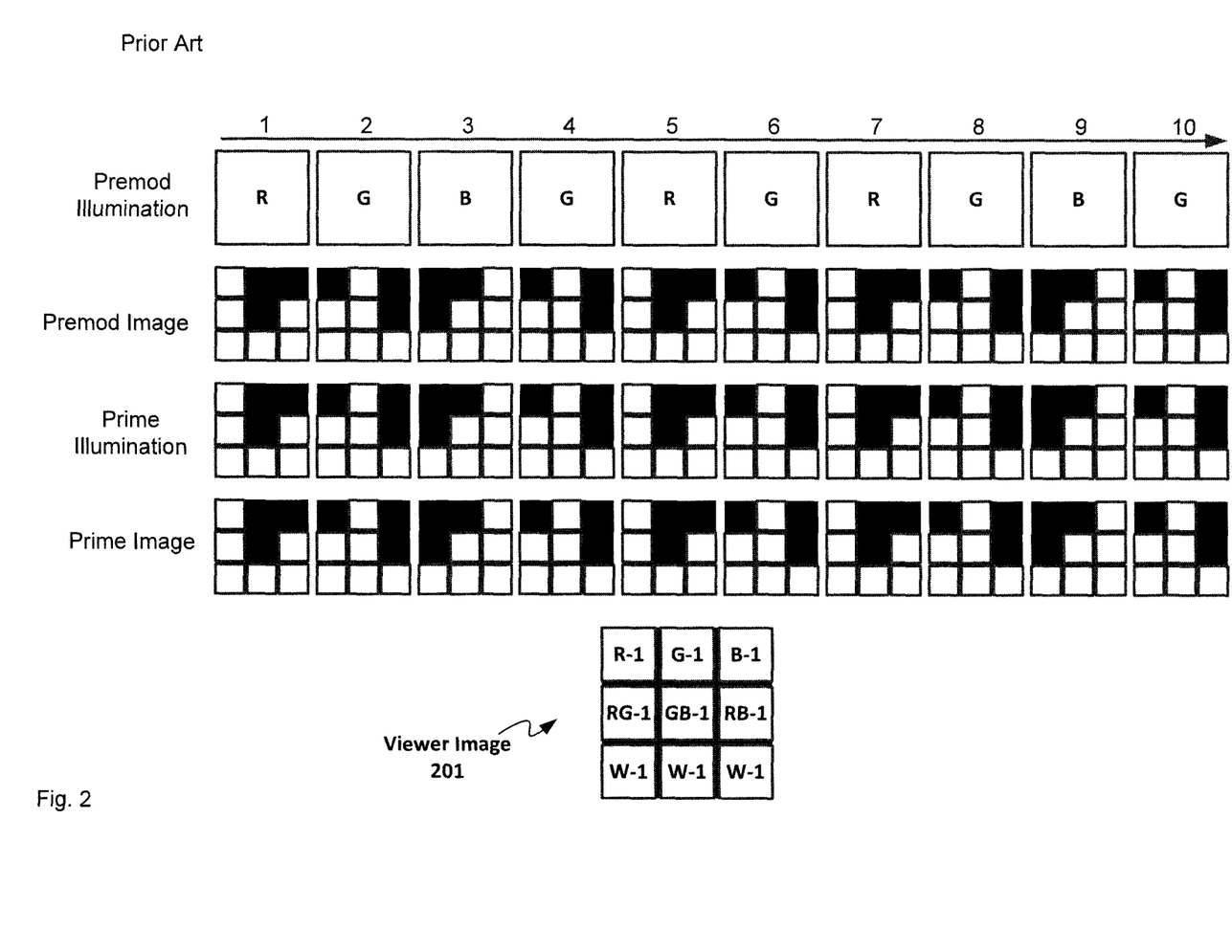
FIG. 2 depicts a sequence of sub-frames when the system of FIG. 1 is operated in a time-sequence mode, according to the prior art.

Attention is next directed to FIG. 2, which depicts a sequence formed in system 100 when operated in a time-sequenced mode, according to the prior art, to form a frame of an image; specifically, it is assumed in FIG. 2 that a frame is composed of ten sub-frames, and that each of pre-modulators 114 and primary modulator 118 comprise a 3×3 pixel array (nine pixels in total). It is further assumed that pre-modulators 114 are directing red, green and blue images in a sequence to primary modulator 118, as in a system with one primary modulator that is being sequentially illuminated by red, green and blue light. It is further assumed in FIG. 2 that system 100 has duty cycles of 30% red, 50% green and 20% blue, and that the resulting image color intensity is nominally 1.0 in arbitrary units. Throughout the specification, including FIG. 2, the colours red, green and blue will be indicated by either, respectively "R", "G", "B" or, respectively, "r", "g", "b".

Furthermore, on-pixels, whether of illumination light or of a modulator, are depicted as white squares, while off-pixels are depicted as black squares and/or areas.

Indeed, the conventions described with respect to FIG. 2 will be used throughout the remainder of the specification.

Further, sequences (i.e. rows) labelled "Illumination" indicate colours of light that are being conveyed between components of system 100, and sequences labelled "Image" indicate on and off pixels for respective pre-modulators 114 or prime modulator 118. For example, the "Premod Illumination" sequence corresponds to colours of light sequentially illuminating a corresponding pre-modulator 114, the "Premod Image" sequence corresponds to images formed from pixels of corresponding pre-modulators 114 from a respective illuminating colour (i.e. each set of pixels in each column of the "Premod Image" corresponds to a sub-frame of an image), the "Prime Illumination" sequence corresponds to light illuminating prime modulator 118, and the "Prime Image" corresponds to images from pixels of prime modulator 118. It is further understood that each pre-modulator 114 and prime modulator 118 is controlled to form the images depicted by image processor 130.

As such, the "Premod Illumination" sequence shows that red, green and blue light is sequentially used to form corresponding pre-modulator images, shown by the "Premod Image" sequence. In other words, using R to indicate red, G to indicate green and B to indicate blue, illuminating light has the following sequence: RGBGRGRGBG, while pre-modulators 114 sequentially form the corresponding images depicted by the "Premod Image" sequence in FIG. 2. It is assumed in FIG. 2 that components of a sequence in a given "Premod Illumination" column all correspond to the colour indicated in the "Premod Illumination" row. Hence, in column "1" in the depicted sequence, only a red image is being conveyed to prime modulator 118, the red image formed by pre-modulator 114r, while pre-modulators 114g, 114b are directing all green and blue light, respectively, to light dumps 115g, 115b. Similarly, in column "2" in the depicted sequence, only a green image is being conveyed to prime modulator 118, the green image formed by pre-modulator 114g, while pre-modulators 114r, 114b are directing all red and blue light, respectively, to light dumps 115r, 115b. Similarly, in column "3" in the depicted sequence, only a blue image is being conveyed to prime modulator 118, the blue image formed by pre-modulator 114b, while pre-modulators 114r, 114g are directing all red and green light, respectively, to light dumps 115r, 115g. For the remaining columns, combinations of red, green and blue images are simultaneously conveyed to prime modulator 118, as in columns 1, 2 and 3. An image formed by prime modulator 118 in each column corresponds to the respective red, green or blue image, formed by each pre-modulator 114.

In other words, the images formed by pre-modulators 114 in each column, as depicted in the "Premod Image" sequence, correspond to red, green and blue images formed that are to be combined to form a full colour image. Hence, prime modulator 118 is being sequentially illuminated with red, green and blue light formed into images similar to the images in the "Premod Image" sequence, as indicated in the "Prime Illumination" sequence. Pre-modulators 114 are specifically directing images formed from the illuminating colours to areas of the prime modulator 118 that are to form red, green and blue components of the image to be projected. Pixels of prime modulator 118, as depicted in the "Prime Image" sequence, are then formed into similar images to those of the "Premod Image" sequence.

Light from each of the "Premod Image" sequences images are formed into a "Viewer Image" 201, as also depicted in FIG. 2: viewer image 201 comprises pixels that can be viewed by a viewer formed by the on-pixels of prime modulator 118 reflecting red, green and blue light from the "Prime Illumination" sequence. The viewer image is the image projected by projection lens 120 onto a screen, and the like.

In viewer image 201, pixels formed from red light indicated by "R", pixels formed from green light indicated by "G", pixels formed from blue light indicated by "B", pixels formed from red light and green light (e.g. yellow light, and the like) indicated by "RG", pixels formed from green light and blue light indicated by "GB" (e.g. turquoise light, and the), pixels formed from red light and blue light indicated by "RB" (e.g. purple light, and the like), and pixels formed from all three of red light, green light and blue light indicated by "W" (i.e. white). On viewer image 201, normalized intensities of each pixel are also indicated, with an intensity of "1" indicated for each.

It is further appreciated that, in an alternative implementations, each pre-modulator 114 can be operated in a mode where all pixels are on for a respective column and viewer image 201 is formed entirely by modulation of red, green and blue light, sequentially, by prime modulator 118; in such modes, no pre-modulation occurs.

Figure 3:
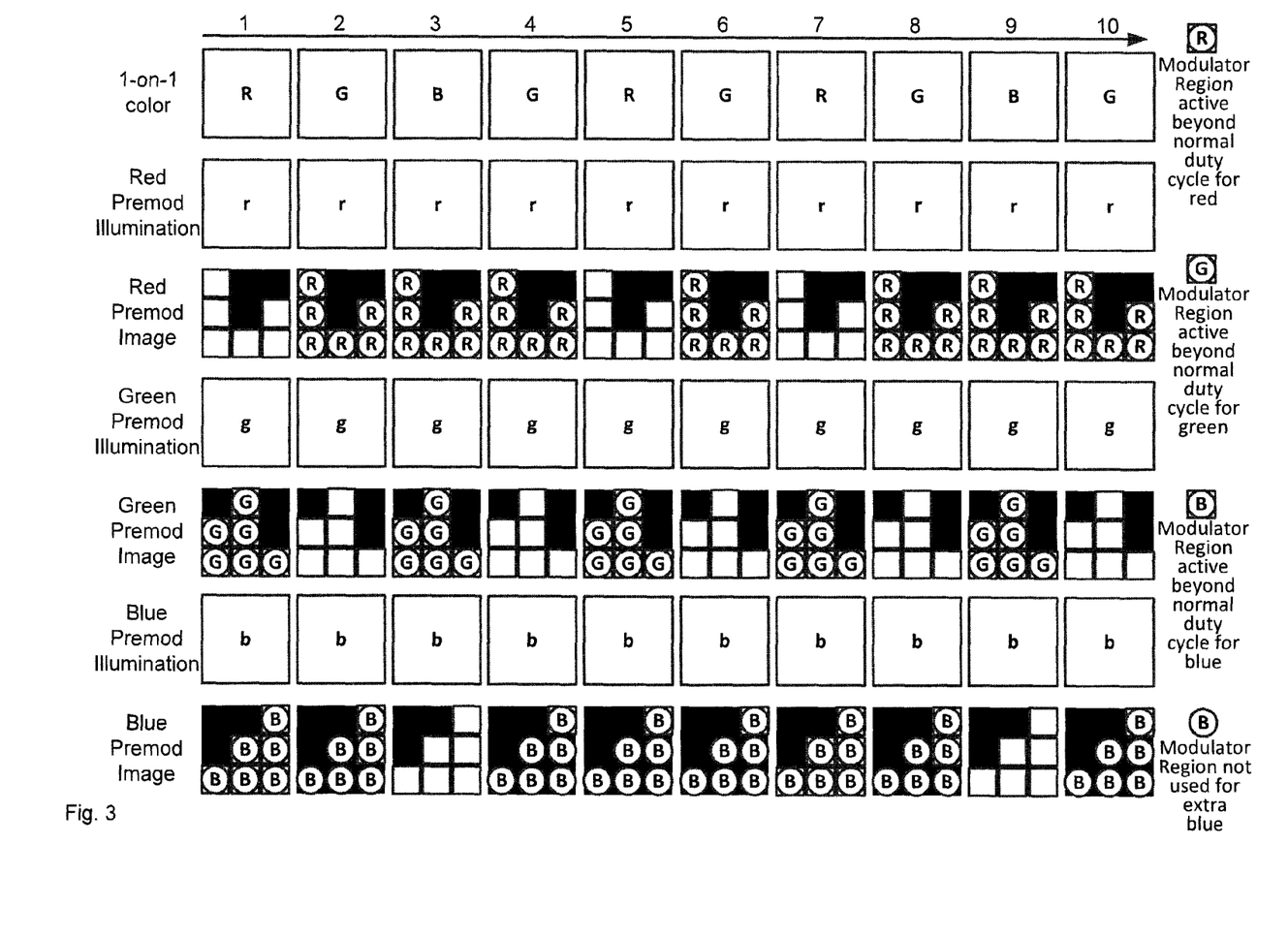
FIG. 3 depicts a sequence of sub-frames when the system of FIG. 1 is operated in a modulation-sequence mode, according to non-limiting implementations.
Figure 4:
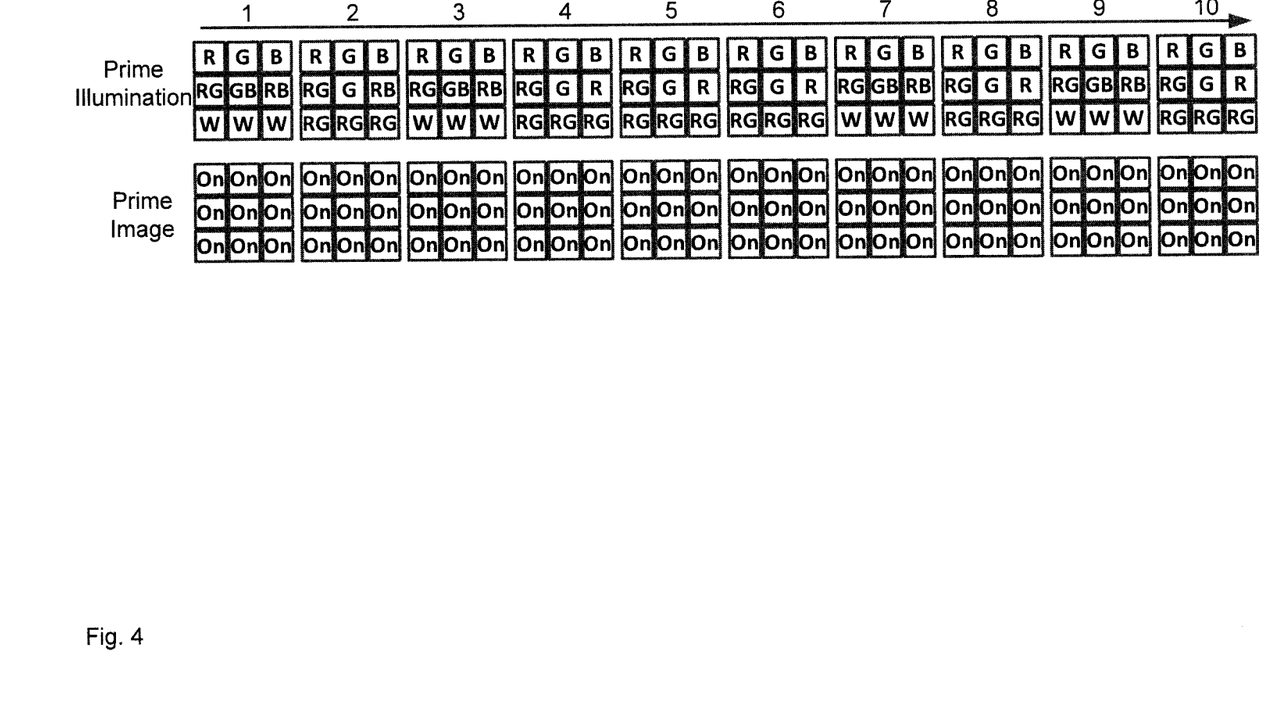
FIG. 4 depicts a continuation of the sequence of subframes of FIG. 3, according to non-limiting implementations.

Attention is next directed to FIGS. 3 and 4 which depict a sequence formed in system 100 when operated in a modulation-sequenced mode, according to present implementations to form a frame of an image; specifically, it is assumed in FIGS. 3 and 4 that a similar image is being formed by system 100 as in FIG. 2, that a frame is composed of ten sub-frames, and that each of pre-modulators 114 and primary modulator 118 comprise a 3×3 pixel array (nine pixels in total), as in FIG. 2. However, in contrast to FIG. 2, where each colour is operated sequentially, and images are formed sequentially by each pre-modulator 114, in the modulation-sequence mode of FIGS. 3 and 4, two or more of pre-modulators 114 are simultaneously spatially modulating illuminating light colours across prime modulator 118 such that illuminating light from two or more pre-modulator 114 are combined at prime modulator 118.

Each column of FIGS. 3 and 4 represents a nominal colour sequence that is the same as in FIG. 2; specifically, the first row of FIG. 3 depicts a "1-on-1" colour sequence similar to the first row of FIG. 2, which corresponds to a nominal sub-frame being formed from a given colour for each column of the row. In other words, the colour sequence being represented by "1-on-1" represents a portion of a duty cycle for respective colour of illuminating light, though other colours are spatially modulated across prime modulator 118 during the duty cycle of another colour.

As in FIG. 2, in FIGS. 3 and 4, sequences labelled "Illumination" indicate colours of light that are being conveyed between components of system 100, and sequences labelled "Image" indicate on and off pixels for respective pre-modulators 114 or prime modulator 118. For example, the "Red Premod Illumination" sequence corresponds to red illuminating light illuminating pre-modulator 114r, and the "Red Premod Image" sequence corresponds to images formed from pixels of pre-modulator 114r from the "Red Premod Illumination; the "Green Premod Illumination" sequence corresponds to green illuminating light illuminating pre-modulator 114g, and the "Green Premod Image" sequence corresponds to images formed from pixels of pre-modulator 114g from the "Green Premod Illumination; the "Blue Premod Illumination" sequence corresponds to blue illuminating light illuminating pre-modulator 114b, and the "Blue Premod Image" sequence corresponds to images formed from pixels of pre-modulator 114b from the "Blue Premod Illumination, the "Prime Illumination" sequence corresponds to light illuminating prime modulator 118, and the "Prime Image" corresponds to images from pixels of prime modulator 118. It is further understood that each pre-modulator 114 and prime modulator 118 is controlled to form the images depicted by image processor 130.

It is further appreciated that FIG. 4 is a continuation of FIG. 3, with the rows of FIG. 4 understood to be located underneath the rows of FIG. 3, with columns aligned according to the numbering sequence of 1 to 10, as indicated.

In the first column of FIGS. 3 and 4, which corresponds to a red duty cycle, as indicated in the first row of FIG. 3, pre-modulator 114r is illuminated with red light (as indicated by the first column of the "Red Premod Illumination" sequence), and pre-modulator 114r forms an image corresponding to a red component of a viewer image, similar to the "Premod Image" of columns of FIG. 2 corresponding to red duty cycles. However, in contrast to FIG. 2, in FIGS. 3 and 4, both pre-modulators 114g, 114b are illuminated with green and blue light, respectively, and each form forms a respective image corresponding to a green component of a viewer image and a blue component of a viewer image, each respective image similar to the "Premod Image" of columns of FIG. 2 corresponding to green and blue duty cycles.

Each of the red, green and blue images formed by pre-modulators 114 are combined in illumination light by optics 116, 117 to form "Prime Illumination" light depicted in FIG. 4, with each pixel in the "Prime Illumination" row labelled "R", "G", "B" and/or a combination thereof, to indicate which illumination light colours are being used to illuminate prime modulator 114. As also depicted in FIG. 4, pixels of prime modulator that correspond to on-pixels of all off the images formed by pre-modulators 114 are also on. As each pixel of prime modulator 114 corresponds to one or more pixels of on-pixels of the images formed by pre-modulators, all pixels of prime-modulator 114 are in an on state. In implementations, where images formed by pre-modulators 114 comprise a common pixel that is in an off-state the corresponding pixel in prime modulator 118 would also be in an off-state.

Hence, in comparison to FIG. 2, in FIGS. 3 and 4, pixels for two or more of pre-modulators 114 are "on" and/or active during a duty cycle for another pre-modulator 114. Such pixels that are on during a duty cycle for another pre-modulator are depicted with one of the letters "R", "G", "B" located in a circle inscribed within a square. A legend for such pixels is also depicted in FIG. 3.

Hence, in column 1, associated with a duty cycle of illuminating red light and/or pre-modulator 114r, images formed by pre-modulators 114g, 114b (i.e. images formed from green light and blue light) are also provided, as indicated by the "G" and "B" pixels located in a circle inscribed in a square. Similarly, in column 2, associated with a duty cycle of illuminating green light and/or pre-modulator 114g, images formed by pre-modulators 114r, 114b (i.e. images formed from red light and blue light) are also provided, as indicated by the "R" and "B" pixels located in a circle inscribed in a square. Similarly, in column 3, associated with a duty cycle of illuminating blue light and/or pre-modulator 114b, images formed by pre-modulators 114r, 114g (i.e. images formed from red light and green light) are also provided, as indicated by the "R" and "G" pixels located in a circle inscribed in a square.

Furthermore, for colour balance for some pixels, not all pixels need by on for a particular image provided by a pre-modulator 114 during a duty cycle of another pre-modulator 114. For example, the human eye can be more sensitive to blue than green or red, hence, a subset pixels of images provided by pre-modulator 114b during a duty cycle of pre-modulators 114r, 114g can be off, as indicated by the letter "B" located in a circle without a square.

Hence, for example, in column 2, not all pixels of an image formed by a pre-modulator 114b are on; for example, comparing the image formed by pre-modulator 114b in each of columns 1, 2 and 3, in columns 1 and 3, all of pixels of an image formed by pre-modulator 114b are on, while in column 2, only a portion of the pixels of the same image are on, while others are off.

In any event, as depicted in FIG. 4, for each sub-frame and/or duty cycle forming the frame defined by FIGS. 3 and 4, two or more colours illuminate some pixels of prime modulator 118, while only one illuminating colour illuminates other pixels.

Figure 5:
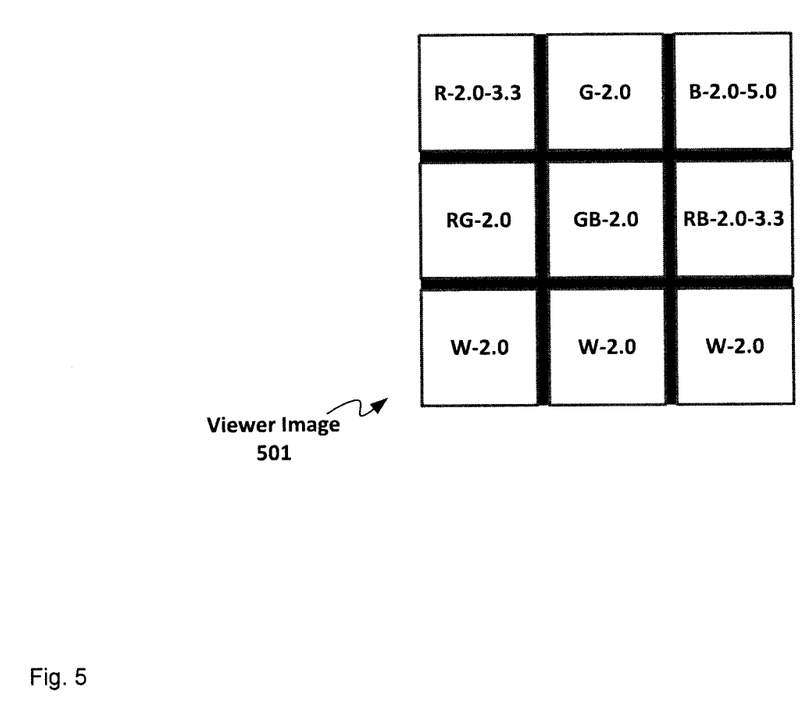
FIG. 5 depicts a viewer image formed by the sequence of FIGS. 3 and 4, according to non-limiting implementations.

Attention is next directed to FIG. 5, which depicts a viewer image 501 formed from the sub-frames depicted in FIGS. 3 and 4; specifically, the colour of each pixel is depicted, with the same conventions used as in FIG. 2, along with the relative intensities of each pixel relative to the intensities of viewer image 201. As each illuminating colour is on for a longer period of the sub-frames of FIGS. 3 and 4, as compared to the sub-frames of FIG. 2, the relative intensities of viewer image 501 is higher than for viewer image 201. Hence, for the same image, the intensity of each pixel is 3 to 5 times higher for viewer image 501 as compared to viewer image 201. For example, comparing the upper right pixel in the top row of each of viewer images 201, 501, the intensity of blue in image 201 is 1.0, while the intensity of blue in image 501 can range from 2.0 to 5.0: in the sequence in FIG. 2, this pixel of blue light is "on" only twice during the sequence, while in the sequences in FIGS. 3 and 4, the pixel is on ten times during the sequence. Hence, as depicted, the intensity of this pixel for image 501 is 5 times that of image 201. Indeed, such brightness may be undesirable in some images, hence, in some implementations, instructions processed by image processor 130 can control the on-time of primary colours so that the increase in intensity across all pixels is limited to a defined maximum value.

Furthermore, implementations described with respect to FIGS. 3 and 4 can be most effective when applied to saturated colours such that pixels of one illuminating light colour represent saturated colour pixels of the one illuminating light colour. In other words, while in FIGS. 3 and 4, colour mixing can occur during the spatial modulation, the modulation-sequence mode can be most effective when a viewer image comprises regions of saturated colours and/or primary colours to dramatically increase the brightness of such colours in those regions and/or to reduce rainbow effects in the viewer image.

However, when the viewer images comprise adjacent regions of saturated colours, time-sequencing can be more effective at providing the viewer image. Hence, each of at least two spatial light pre-modulators 114 can be further configured to time-sequence the illuminating light colours across the primary spatial modulator 118.

Further, system 100 can be configured to change operation between a modulation-sequence mode, as in FIGS. 3 and 4, and a time-sequence mode, as in FIG. 2, with image processor 130 changing the operating mode of system 100 according to image content of images provided by image source 125. For example, in regions where content of images provided by image source 125 is above a threshold percentage of saturated colours, image processor 130 could operate system 100 in a time-sequence mode, and in other image regions operate system 100 in a modulation-sequence mode. Specifically, a time-sequence mode allows for sequential saturated colours illuminating primary modulator 118, while a modulation-sequence mode allows for colours to be mixed, as described herein.

Persons skilled in the art will appreciate that there are yet more alternative implementations and modifications possible. For example, while in FIGS. 3 and 4 it is assumed that each duty cycle of each sub-frame is of a similar length of time, in other implementations, a length of time of a duty cycle for one or more sub-frames can differ from a duty cycle of other sub-frames. Hence, at least two spatial light pre-modulators 114 can be further configured to not use one or more of the illuminating light colours and expand a respective duty cycle of remaining illuminating light colours.

For example, consider implementations where a frame comprises combinations of only two illuminating colours, for example blue and green; in such implementations, light modulators 114 can be configured to not use red light and expand a duty cycle of each of the green illuminating light and the blue illuminating light. With reference to FIGS. 3 and 4, in such implementations, a duty cycle of one or more of columns 2, 3, 4, 6, 8, 9 and 10 are expanded with respect to a duty cycle of columns 1, 5 and 7. Indeed, such an expansion in duty can include lengthening a duty cycle of one or more of columns 2, 3, 4, 6, 8, 9 and 10 and/or shortening a duty cycle of one or more of columns 1, 5 and 7.

In yet further implementations, one or more of the illuminating light colours can be operated at a maximum intensity, and at least two spatial light pre-modulators 114 are further configured to reduce associated duty cycles of the one or more of the illuminating light colours while expanding respective duty cycles of remaining illuminating light colours. Alternatively, two or more of the illuminating light colours can be operated at a minimum intensity, and at least two spatial light pre-modulators 114 are further configured to mix the two or more of the illuminating light colours onto prime modulator 118 during respective duty cycles of remaining illuminating light colours.

In other words, the relative intensities of colours of viewer image 501 can be controlled by changing a length of associated duty cycles and/or by controlling which colours illuminate prime modulator 118 during each sub-frame. Such control can occur using image processor 130, which can analyze images received from image source 125 to determine relative brightness of each of the images when rendered at viewer image 501. In other words, in present implementations, image processor 130 can comprise an integrated sub-frame generator, which, in the prior art, is integrated into image modulators.

Figure 6:
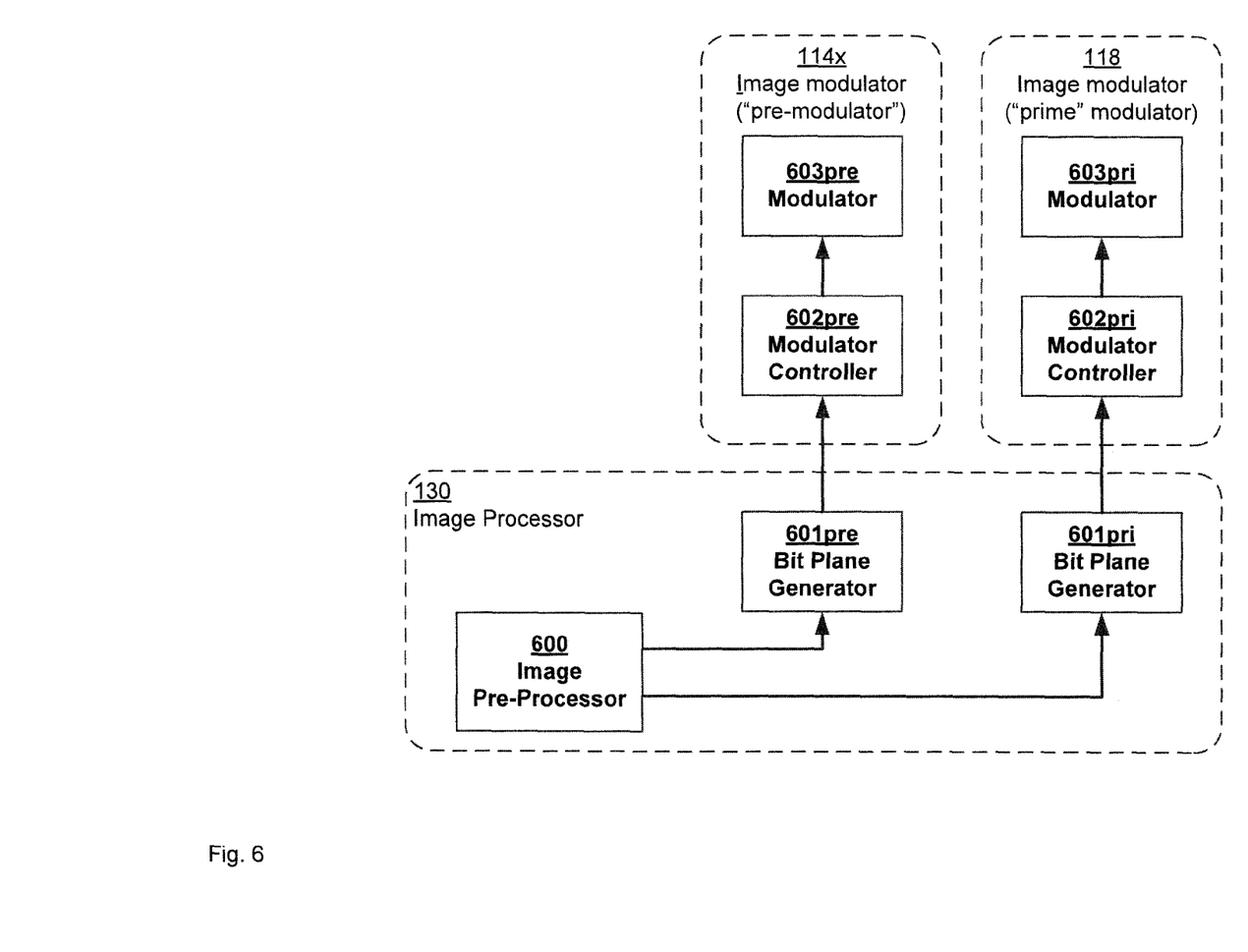
FIG. 6 depicts an architecture of the image processor and modulators of the system of FIG. 1, according to non-limiting implementations.

For example, attention is next directed to FIG. 6, which depicts an example architecture of image processor 130, a pre-modulator 114x (i.e. each pre-modulator 114) and prime modulator 118. Specifically, in these implementations, image processor 130 comprises an image pre-processor 600 configured to pre-process images received from image source 125, and sub-frame generators 601pre, 601pri, in communication with pre-processor 600 each configured to respectively generate sub-frames for each of pre-modulators 114 and prime modulator 118. Sub-frames generated by sub-frame generators 601pre, 601pri are communicated to respective modulator controllers 602pre, 602pri at each of pre-modulators 114 and prime modulator 118, which control modulators 603pre, 603pri, respectively at each of pre-modulators 114 and prime modulator 118.

Yet further implementations are possible. For example system 100 comprises at least two spatial light pre-modulators 114 comprising: a first light modulator 114r configured to modulate a first illuminating colour; a second light modulator 114g configured to modulate a second illuminating colour; and a third light modulator 114b configured to modulate a third illuminating colour. However, in other implementations, a system similar to system 100 can comprise at least two spatial light pre-modulators comprising: a first light modulator configured to modulate a first illuminating colour; and a second light modulator configured to modulate a second illuminating colour and a third illuminating colour in a sequence. In other words, such systems comprise only two pre-modulators and optics configured to alternate illuminating one of the pre-modulators with two different colours of light.

Such systems can also be operated in a modulation sequence mode, with images formed by at least two of the illuminating light colours illuminating a prime modulator simultaneously, though the relative brightness increases will be less than those achieved in systems with three pre-modulators as in system 100. Such two pre-modulator systems can be used in with two colour illumination systems which generate, for example, blue light and yellow light, where the yellow light is separated into red and green components by splitter optics.

In yet further implementations, one or more duty cycles of pre-modulators can be used to vary intensity of infrared light.

In any event, disclosed herein are systems in which illumination of a prime modulator by light fields that, at any given time, vary spatially across the prime modulator not just in intensity but in color as well by two or more pre-modulators. This shifts the color mixing effort from the prime modulator (time sequential) towards the pre-modulators, which can reduce time sequential artifacts such as "rainbow". Image processing can be used to determine the image content to send to the pre-modulators to generate the color variation across the prime modulator to maximize image brightness and/or when to operate a cascade system in a time-sequence mode or a modulation sequence mode.

Those skilled in the art will appreciate that in some implementations, the functionality of system 100 can be implemented using pre-programmed hardware or firmware elements (e.g., application specific integrated circuits (ASICs), electrically erasable programmable read-only memories (EEPROMs), etc.), or other related components. In other implementations, the functionality of system 100 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
   at least two spatial light pre-modulators; and,
   a primary spatial light modulator, each of the at least two spatial light pre-modulators configured to vary illuminating light colours spatially across the primary spatial prime modulator simultaneously with at least two of the illuminating light colours, and the primary spatial light modulator configured to form the illuminating light colours into images and turn on pixels of each of the at least two of the illuminating light colours simultaneously in synchronization with the at least two spatial light pre-modulators, each of the at least two spatial light pre-modulators being further configured to vary the illuminating light colours spatially across the primary spatial prime modulator at a resolution that is lower than the images formed by the primary light modulator.

2. The system of claim 1, further comprising relay optics configured to direct the illuminating light colours from the at least two pre-modulators to the primary light modulator.

3. The system of claim 1, wherein the pixels of each of the at least two of the illuminating light colours represent saturated colour pixels.

4. The system of claim 1, wherein each of the at least two spatial light pre-modulators are further configured to time-sequence the illuminating light colours across the primary spatial modulator.

5. The system of claim 1, wherein the at least two spatial light pre-modulators are further configured to not use one or more of the illuminating light colours and expand a respective duty cycle of remaining illuminating light colours.

6. The system of claim 1, wherein one or more of the illuminating light colours is operated at a maximum intensity, and the at least two spatial light pre-modulators are further configured to reduce associated duty cycles of the one or more of the illuminating light colours while expanding respective duty cycles of remaining illuminating light colours.

7. The system of claim 1, wherein two or more of the illuminating light colours are operated at a minimum intensity, and the at least two spatial light pre-modulators are further configured to mix the two or more of the illuminating light colours onto the prime modulator during respective duty cycles of remaining illuminating light colours.

8. The system of claim 1, further comprising one or more light sources configured to produce the illuminating light colours.

9. The system of claim 1, wherein the at least two spatial light pre-modulators comprise: a first light modulator configured to modulate a first illuminating colour; and a second light modulator configured to modulate a second illuminating colour and a third illuminating colour in a sequence.

10. The system of claim 1, wherein the at least two spatial light pre-modulators comprise: a first light modulator configured to modulate a first illuminating colour; a second light modulator configured to modulate a second illuminating colour; and a third light modulator configured to modulate a third illuminating colour.

11. The system of claim 1, further comprising an image processor in communication with each of the at least two spatial light pre-modulators and the primary spatial light modulator, the image processor configured to synchronize the at least two spatial light pre-modulators with the primary spatial light modulator.

12. The system of claim 11, further comprising a subframe generator integrated with the image processor.

* * * * *